US00RE38261E

(19) United States
(12) Reissued Patent
White

(10) Patent Number: US RE38,261 E
(45) Date of Reissued Patent: Oct. 7, 2003

(54) RANGED LIMITED PROJECTILE USING AUGMENTED ROLL DAMPING

(75) Inventor: Charles O. White, Newport Beach, CA (US)

(73) Assignee: General Dynamic Ordnance and Tactical System, Inc., St. Petersburg, FL (US)

(21) Appl. No.: 09/919,460

(22) Filed: Jul. 31, 2001

Related U.S. Patent Documents

Reissue of:
(64) Patent No.: 5,932,836
Issued: Aug. 3, 1999
Appl. No.: 08/926,153
Filed: Sep. 9, 1997

(51) Int. Cl.[7] ..... F42B 10/48
(52) U.S. Cl. ..... 102/529; 244/3.1
(58) Field of Search ..... 102/395, 430, 102/439, 444, 498, 501, 517, 519, 526, 529; 244/3.1, 3.23, 3.24

(56) References Cited

U.S. PATENT DOCUMENTS

| | | | |
|---|---|---|---|
| 215,015 | A | 5/1879 | Merriam |
| 2,612,108 | A | 9/1952 | Schmidt |
| 3,751,037 | A | 8/1973 | Courneya |
| 4,063,511 | A | 12/1977 | Bullard |
| 4,239,006 | A | 12/1980 | Kelson |
| 4,520,972 | A | 6/1985 | Diesinger et al. |
| 4,653,405 | A | 3/1987 | Paine |
| 4,682,546 | A | 7/1987 | Chovich |
| 4,700,630 | A | 10/1987 | Sullivan |
| 4,708,065 | A | 11/1987 | Schilling et al. |
| 4,765,248 | A | 8/1988 | Kruse et al. |
| 4,813,635 | A | 3/1989 | Paterson et al. |
| 4,827,847 | A | 5/1989 | Laviolette et al. |
| 4,860,661 | A | 8/1989 | Bock et al. |
| 4,905,602 | A | 3/1990 | Buckland |
| 5,116,224 | A | 5/1992 | Kelsey, Jr. |
| 5,133,261 | A | 7/1992 | Kelsey, Jr. |
| 5,164,538 | A | 11/1992 | McClain, III |
| 5,476,045 | A | 12/1995 | Chung et al. |
| 5,505,137 | A | 4/1996 | Godefroy et al. |
| 5,682,011 | A | 10/1997 | Sabranski et al. |

FOREIGN PATENT DOCUMENTS

| | | | |
|---|---|---|---|
| CA | 1266796 | 3/1990 | ..... 102/503 |
| DE | 2 831 574 | 2/1979 | |
| FR | 2 286 364 | 4/1976 | |
| GB | 2 091 856 | 8/1982 | |
| GB | 2 105 444 | 3/1983 | |
| WO | WO 86/06827 | 11/1986 | |

*Primary Examiner*—Harold J. Tudor
(74) *Attorney, Agent, or Firm*—Todd E. Garabedian; Wiggin & Dana LLP

(57) ABSTRACT

A training projectile that utilizes flutes or flats to augment roll damping characteristics and thereby cause the projectile to crossover into a gyroscopically unstable trajectory pattern at a predetermined time. Prior to the crossover, the training projectile maintains a gyroscopically stable trajectory, which enables extrapolation to ascertain the trajectory of a non-training projectile that does not have an augmented roll damping section. The unstable trajectory pattern substantially reduces the distance the training projectile can traverse, thereby reducing the amount of area required for a training range.

14 Claims, 8 Drawing Sheets

RANGED LIMITED PROJECTILE USING AUGMENTED ROLL DAMPING

Matter enclosed in heavy brackets [ ] appears in the original patent but forms no part of this reissue specification; matter printed in italics indicates the additions made by reissue.

The U.S. Government has a paid-up license in this invention and the right in limited circumstances to require the patent owner to license others on reasonable terms as provided for by the terms of DAAAZI-90-C-0096 awarded by the Department of the Army.

BACKGROUND OF THE INVENTION

1. Field of the Invention

This invention relates to a new and improved training projectile that has a predetermined range limited trajectory characteristic. More particularly, radially distributed flats induce the onset of gyroscopic instability at a predetermined range, thereby reducing the overall flight path of the projectile.

2. Description of the Art

U.S. Pat. No. 4,063,511 (Bullard) discloses a spinning shotgun projectile with grooves to streamline the projectile body thereby decreasing air resistance during flight.

U.S. Pat. No. 4,520,972 (Diesinger et al.) discloses a spin-stabilized training projectile, which changes its axial stability by operation of a stabilizer mounted at the rear end of the projectile.

U.S. Pat. No. 4,708,065 (Schilling et al.) discloses a training projectile with an annular recess around its circumference but does not use roll damping to truncate the normal trajectory of the projectile.

U.S. Pat. No. 4,905,602 (Buckland) discloses a spin-damped training projectile, which has an array of spin-damping fins mounted on the nose of the projectile.

Ranges for testing the trajectory of large caliber ammunition require a great deal of area for obvious safety reasons. A typical range for a 25-mm projectile has a length of approximately 14-km because projectiles of 25-mm typically travel a distance of 12-km. These distances change depending on the size of the projectile. The larger projectiles require a proportionally larger area. Many ordnance applications, i.e., target practice rounds, require projectiles to satisfy two conflicting objectives: 1) achieve a high performance flat trajectory to a specified range and 2) abruptly decelerate and thereby not exceed a specified range limit. Conventional spin stabilized projectiles, due to their pointed cylindrical shape, are severely limited in the degree to which they can satisfy these two conflicting requirements.

The problem is that high initial velocities result in excessively long carry ranges; or alternatively, if the specified range limitation is met, the initial trajectory performance is inadequate.

The present invention solves this problem by providing a training projectile with a roll damping augmentation section that causes the projectile to become gyroscopically unstable after a traveling a predetermined distance. The gyroscopically unstable trajectory causes the projectile to begin high yaw and thereby reduces the distance the projectile will ultimately travel.

SUMMARY OF THE INVENTION

This invention relates to a projectile that achieves a flat trajectory to a specified predetermined distance and upon reaching that distance abruptly becomes gyroscopically unstable. Accordingly, one embodiment is drawn to a projectile having an ogival nose portion; a posterior portion; and a midportion.

The midportion includes a longitudinally extending roll damping augmentation section disposed in a recess and extending outwardly no more than approximately the depth of the recess. The roll damping augmentation section has flats of flutes defining grooves which interact with oncoming air causing the projectile to become gyroscopically unstable at a predetermined range and continuously gyroscopically unstable thereafter.

DETAILED DESCRIPTION OF THE INVENTION

This invention relates to training rounds for which a range limitation mechanism has no substantial effect on the trajectory with a specified range, but acts to curtail the range thereafter, preventing the training rounds from exceeding the boundaries of the training area.

Typically, a rotating projectile has stable flight when the gyroscopic stability factor, which enables a projectile to have an aerodynamic stabilized flight trajectory, is greater than 1.0 and the dynamic stability factor, which represents the ability of a projectile to maintain a stable trajectory, is between zero and 2.0.

A rotating projectile has a stable flight trajectory when $Sg>1$ where:

$$S_g = \frac{I_x^2}{2I_y C m\alpha \pi P d^3}\left(\frac{\omega d}{v}\right)^2$$

V is the velocity of the undisturbed oncoming air flow; Ix is the axial moment in inertia of the projectile; P is the air density; d is the reference diameter of the projectile; Iy is the transverse moment of inertia of the projectile; ω is the angular velocity about the longitudinal axis of the projectile and Cmα is the aerodynamic moment slope.

Standard International units may be used for consistency.

As d, Ix and Iy are fixed and P and Cmα only vary slightly for low angle, high velocity trajectories, the primary factor governing projectile stability is the ratio of angular velocity to forward velocity (ω/v).

The present invention seeks to achieve a range limited projectile through augmented roll damping which causes the spin rate to decay faster than the forward velocity. In the course of a normal trajectory, the velocity decay is greater than the spin rate decay thus the projectile becomes more stable. If the spin damping of the projectile is increased sufficiently for the spin rate decay to exceed the velocity decay, $S_g$ will decrease during flight and a projectile, which started off stable can have instability induced after travelling a critical distance. It is important that the roll damping mechanism does not increase the projectile drag, nor introduce extraneous pitching moment changes nor alter the Magnus moments in a manner that would adversely affect the capability of the training round to resemble as closely as possible a combat round that it is intended to simulate. The present training round design does not interfere with normal operation of full caliber projectiles on the use of subcaliber projectiles using sabots.

The instant invention enables a projectile to have a first segment of its trajectory gyroscopically stable and thus, correlate to a regular cartridge projectile. The flight characteristics of the first segment of the trajectory can be observed and recorded. The data gathered from observing the first segment of the trajectory may be used to extrapolate the trajectory the projectile would have if the roll damping augmentation feature were not present.

Figure 2:
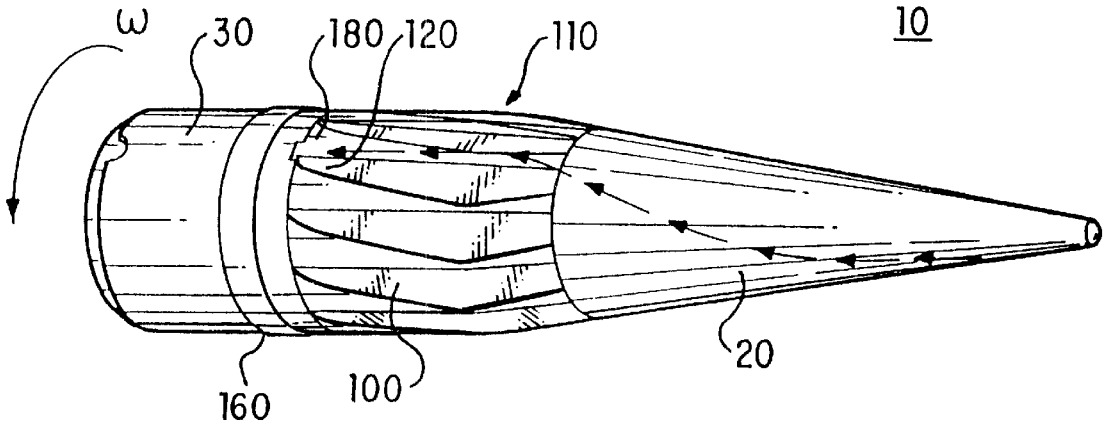
FIG. 2 shows the range limited projectile having a substantially conical nose portion and a roll damping augmentation section having flutes.
Figure 3:
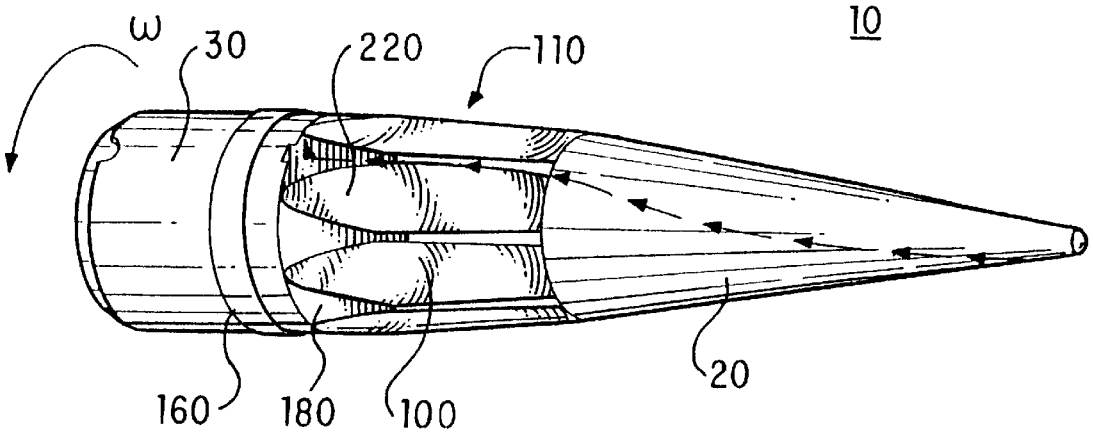
FIG. 3 shows the range limited projectile having a substantially conical nose portion and a roll damping augmentation section having flats which define grooves.

The first section of the trajectory has a flight velocity imparted from a muzzle with a Mach number. The firing also imparts an angular velocity proportional to the barrel rifling twist angle. As the projectile proceeds along its flight trajectory, the flight velocity begins to decrease at a faster rate than the angular velocity. This decrease necessitates the inventive augmented roll damping section as shown in FIGS. 2 and 3 to include flutes 120 or flats defining grooves 220 in the body of the projectile to enhance the moment forces around the rotational axis of the projectile and hence decrease the stability of the flight trajectory. Otherwise, the projectile will have a stable flight trajectory and such a trajectory will increase the distance the projectile will travel.

A second segment of the trajectory is gyroscopically unstable due to an increase in the rotational pitching moment caused by the interface of air and the augmented roll damping section of the projectile. The gyroscopic instability causes the projectile to assume high yaw angles. These high yaw angles provide high drag that decreases the distance the projectile will travel. One purpose of the recessed roll damping section 100 is to allow the design to be used in full caliber projectiles, fired from conventional gun barrels; or for the adaptation of existing sub-caliber projectile/sabot configurations without the need to modify the structurally critical subprojectile aft end/pusher base interface or the sabot manufacturing and/or molding process.

A rotating projectile used as a training round has a flight velocity (V) which drops more rapidly than the angular velocity (ω). Thus, as the projectile slows down, the flight pattern becomes more stable. The present invention, by the use of an augmented roll damping section in the midportion of the projectile, causes the projectile to experience a moment about its rotational axis which causes $$\left(\frac{\omega}{V}\right)^2$$

to decrease.

This causes the projectile to become gyroscopically unstable and to begin a high yaw and/or tumbling trajectory.

As shown in FIGS. 2 and 3, the augmented roll damping section 100 can have either flutes 120 or flats defining grooves 220 to interact with the air flow surrounding the projectile. The design of the roll damping feature, specifically the number of recessed flutes 120 or flats 220, angle of the flutes 120 or flats 220 with respect to the longitudinal axis and how deep the flutes 120 or flats 220 are recessed into the body of the projectile, determines at what point in the trajectory path the projectile will become gyroscopically unstable and begin a high yaw flight trajectory. This point is known as the "crossover point" because the projectile is crossing over from a gyroscopically stable trajectory to a gyroscopically unstable trajectory. The crossover point is a function of spin rate, which is the speed the projectile is rotating (angular velocity) and decay rate, which is how braking forces are affecting a projectile's trajectory. By adjusting how rapidly the decay rate increases it is possible to predetermine the crossover point and use that determination to design a projectile with a desired crossover point.

The flutes 120 and flats 220 can have planar or twisted and/or curved surfaces thereby causing the air to have a greater or lesser effect on the trajectory of the projectile. The cumulative effect of a plurality of longitudinally elongated flutes 120 or flats 220, deflecting air currents, causes the moment forces to overcome the tendency for the projectile to become more gyroscopically stable as it decelerates.

The flutes 120 or flats 220 are recessed in the midportion of the projectile 110 such that they do not extend substantially past the ogival surface of the projectile. The depth of the flutes 120 or flats 220 is approximately equal to the depth of the recess in the midportion and should be at least twice as high as the boundary layer momentum height so they do not become submerged in the boundary layer. The boundary layer is an area that surrounds a moving projectile and exerts forces on the projectile.

FIG. 2 and 3 show air flow along the surface of the projectile while in flight. The flutes 120 or flats 220 extend outwardly from the longitudinal axis 710 to overcome boundary layer effects and thus the flutes 120 or flats 220 will increase moment forces on the projectile 10.

FIG. 2 shows the projectile 10 with a nose portion 20 which can be hollow and may be made of any resilient material such as aluminum or steel, a posterior portion 30 and a midportion 110. The midportion 110 has a recessed roll damping augmentation section 100 which includes flutes 120. FIG. 3 shows the projectile 10 with a conical nose portion 20 a posterior portion 30 and the roll damping augmentation section 100 includes flats 220.

The flutes 120 and flats 220 may define air cavities 180, which are filled with on-coming air. The air cavities 180 may be of virtually any depth, however, a depth of 2.5% to 7.5% of the projectile body diameter is preferred with 5.7% of the projectile body diameter being most preferred.

Figure 7:
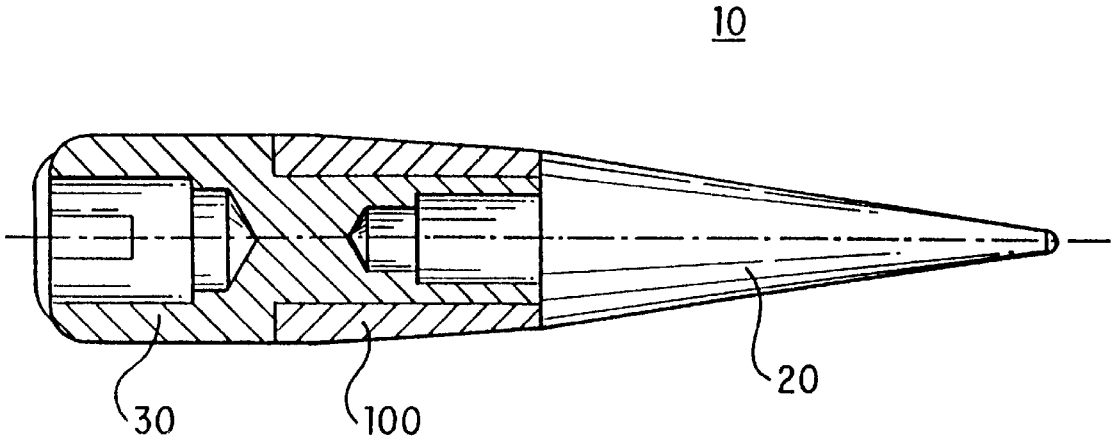
FIG. 7 shows a longitudinal cross-section of the projectile at 90°.

The flutes 120 are aligned along the longitudinal axis 710 of the projectile 10 as shown in FIG. 7. The flutes 120 can be placed at varying degrees in relation to the axis and can vary in shape.

Figure 10:
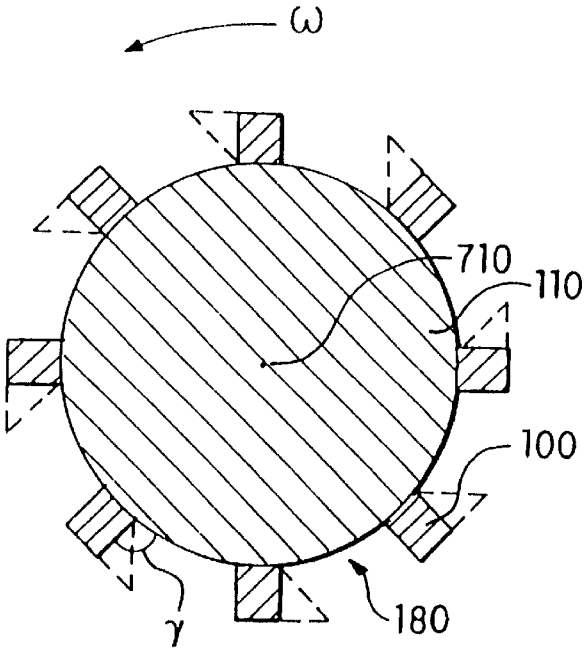
FIG. 10 shows a cross sectional view of the angle of orientation of the roll damping augmentation flutes or flats.

As shown in FIG. 10, roll damping section 100 may be angled in relation to the longitudinal axis 710. The preferred angle of orientation, $\gamma$ is 90° which maximizes the exposed surface area of the roll damping section 100 to oncoming air. As the angle of orientation of the flute or flat is decreased or increased from a 90° perpendicular angle, roll damping section 100 will have less surface area exposed to oncoming air flow because the roll damping section 100 will have more surface area closer to the body of the projectile. The angle or orientation $\gamma$ also affects the shape of the air cavities 180. The midportion roll damping section 100 increases the spin decay rate and deliberately drives the projectile 10 into gyroscopic instability at a predetermined range.

The roll damping augmentation section 100 which includes the flutes 120 or flats 220 is placed in the midsection 110 of the projectile 10, which is near the center of gravity, thereby reducing undesired perturbations in the flight trajectory. The roll damping augmentation section can be the entire length of the projectile or up to 2.0 times the body diameter of the projectile. A preferred length is between 1 and 1.75 times the body diameter of the projectile. The most preferred length is 1.33 times the body diameter of the projectile.

The projectile 10 as shown in FIGS. 2 and 3 has an obturation band 160 to enable the muzzle to impart a spin on the projectile 10 as it is being discharged.

Through variations in the size, number and/or twist angles of the roll damping flutes 120 or flats 220, the projectile's aerodynamic roll damping torques can be tuned to control the time of onset for the high drag condition, thereby providing vast improvements in tailoring the respective fast and slow portions of the trajectory. The deeper the flutes 120 or flats 220 into the midportion 110, the sooner the projectile 10 will become gyroscopically unstable. The flutes 120 or flats 220 redirect the air flow around the surface of the projectile 10 because the flutes 120 and flats 220 cause the aerodynamic forces operating in opposite directions to produce a moment about the rotational axis, which decreases the gyroscopic stability and causes the projectile to being a high yaw and/or tumbling trajectory. As shown in FIGS. 8(*a*) and (*b*), the roll damping section segments 100 can vary. Any number of segments would work. However, a preferred number of segments are between 4 and 12 equally spaced around the circumference of the projectile.

Figure 4:
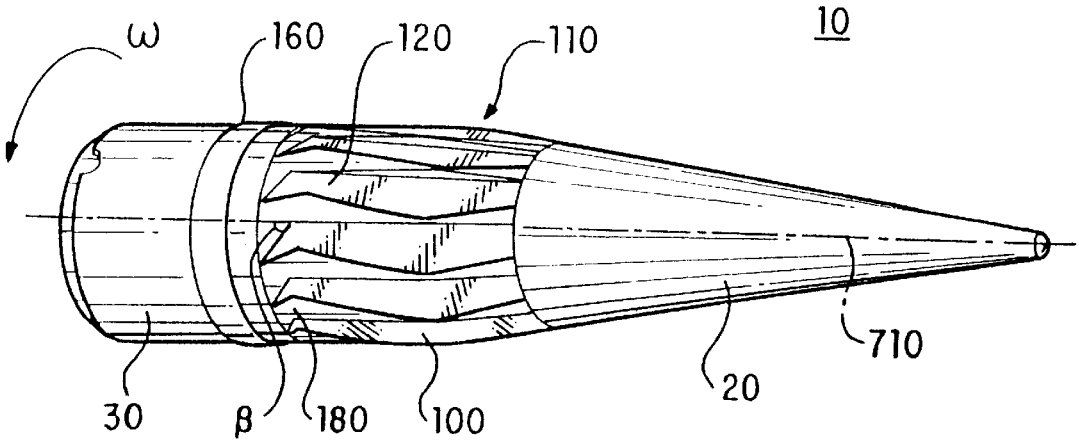
FIG. 4 shows the range limited projectile having canted flutes.
Figure 5:
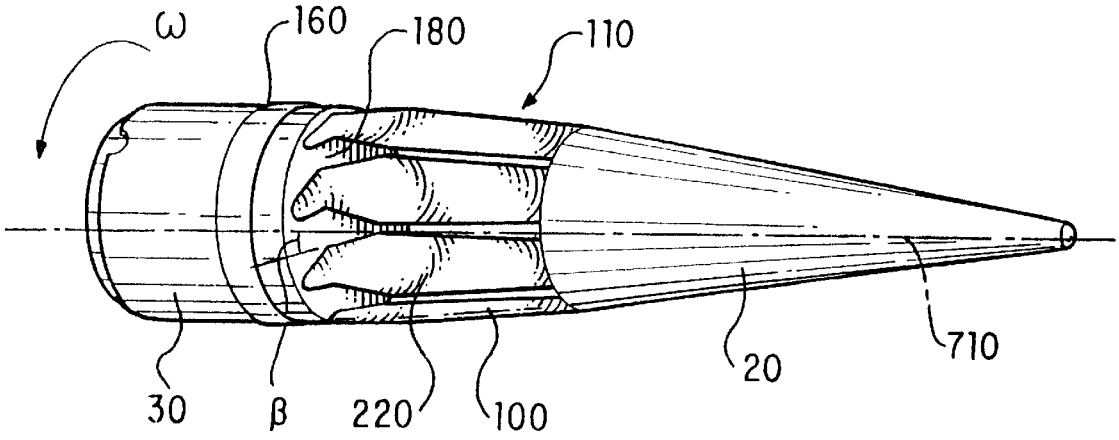
FIG. 5 shows the range limited projectile having canted flats.

As shown in FIGS. 4 and 5, the roll damping augmentation section 110 may be canted at an angle $\beta$ counter to the flow of air to increase the roll damping effect. Increasing the canted angle $\beta$ of the flutes 120 or flats 220 relative to the longitudinal axis 710, increases the angle at which the air interacts with the roll damping section 100. This facilitates crossover to a gyroscopically unstable projectile trajectory, which causes the projectile to have a reduced trajectory. Values for $\beta$ can be between zero and thirty degrees from the longitudinal axis. However, angles between 3 and 5 degrees are preferred. Angles of canting exceeding 15 degrees cause instability early in the flight trajectory.

Figure 9:
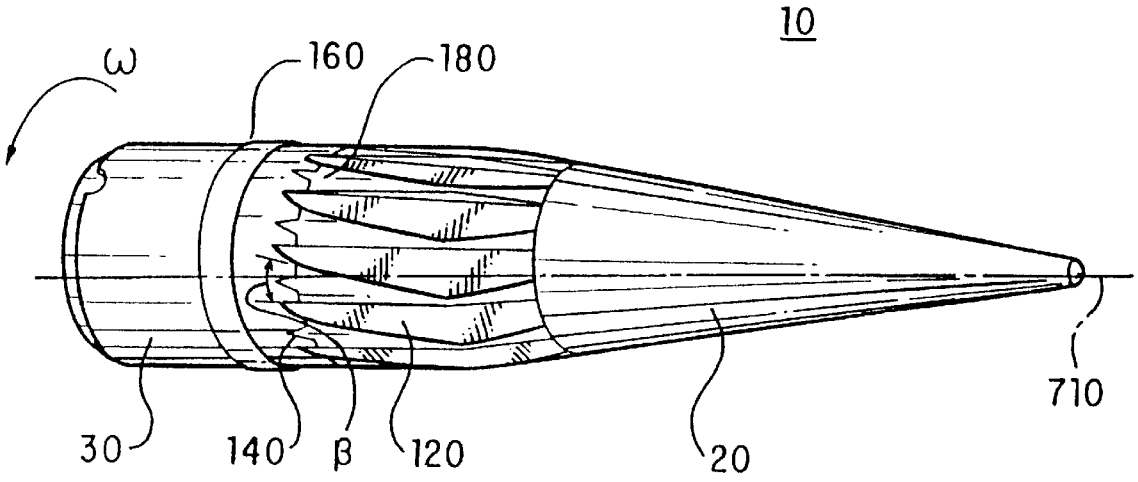
FIG. 9 shows the range limited projectile having adjustable canted roll damping flutes.

As shown in FIG. 9, the roll damping augmentation flutes 120, may also be adjusted by the user so that the angle of canting may be varied in the field. The angle of canting $\beta$ at which the recessed flutes 120 are attached to the posterior portion 30 may be altered by having a plurality of connection slots 140 in the posterior portion 30. Once the individual user selects a desired deflection angle of canting $\beta$, each of the flutes 120 can be affixed to a corresponding slot 140 of the posterior portion 30.

Figure 6:
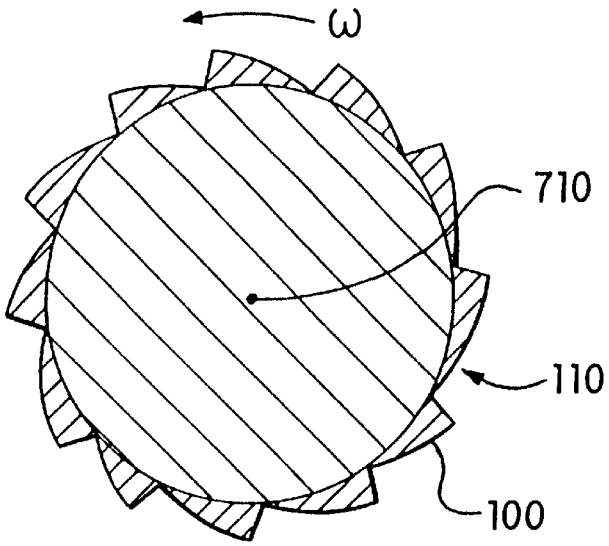
FIG. 6 shows an axial cross-section of the projectile having a canted role damping section.

FIG. 6 shows an axial cross-section of the midbody portion 110 when the roll damping section 100 is slightly canted. This depicts the relative depth of the roll damping section 100. The roll damping section is sufficiently recessed to overcome boundary layer momentum forces.

FIG. 7 shows a longitudinal cross-section of the range limited projectile at 90°.

Figure 8B:
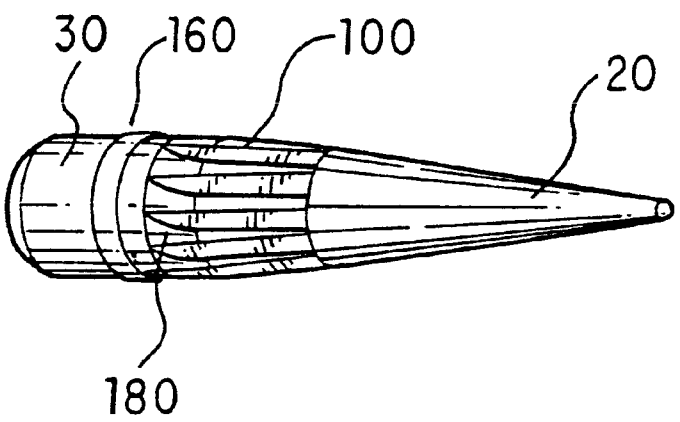
FIG. 8(*a*) and (*b*) shows variations in the number of flutes or flats respectively.
Figure 8A:
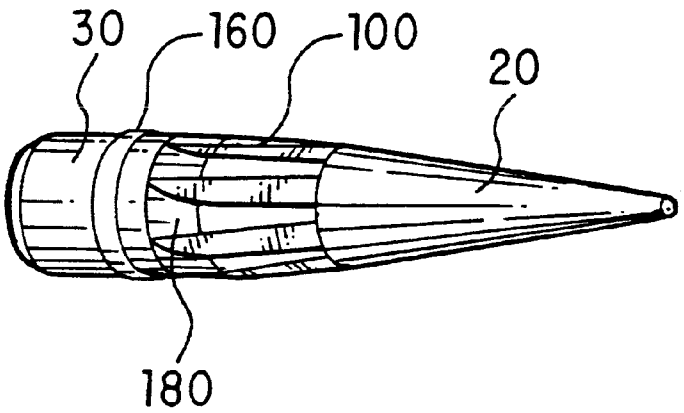

FIGS. 8*a* and 8*b* show that the range limited projectile can have various number of roll damping means.

Figure 13:
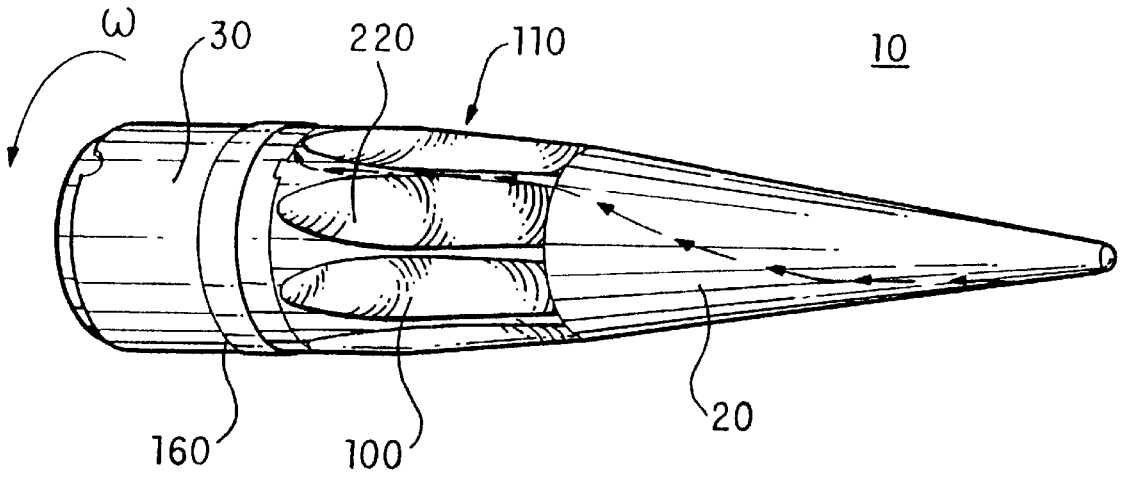
FIG. 13 shows the range limited projectile having a solid roll damping augmentation section.

FIG. 13 shows the roll damping section 100 may be solid. The flats 220 define grooves, which provide an interface with oncoming air thereby increasing the roll damping on the projectile 10. This embodiment does not include an air cavity.

Example 1

Figure 1:
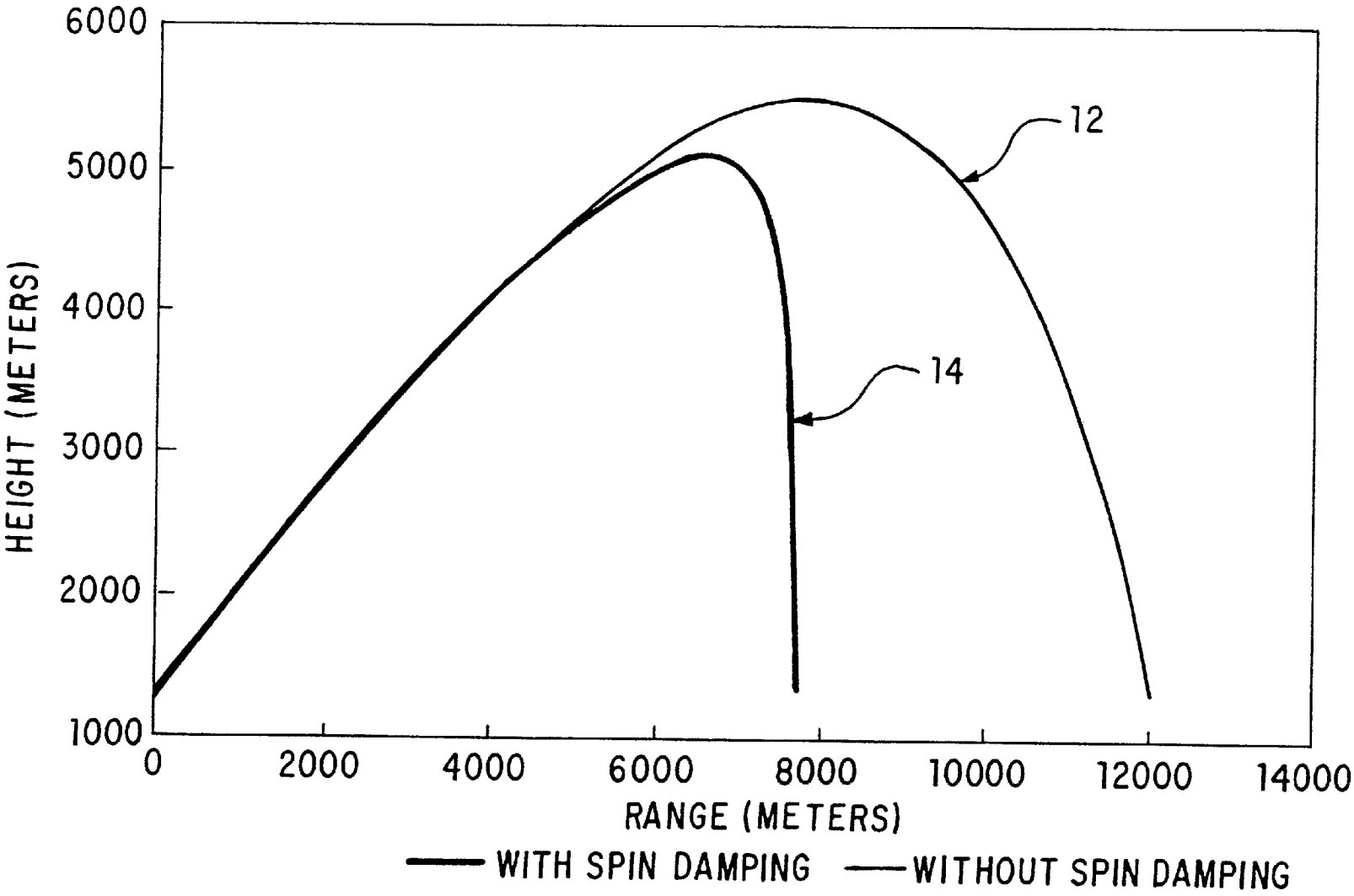
FIG. 1 shows the range limiting characteristics of a projectile with augmented roll damping in accordance with the invention.

FIG. 1 graphically illustrates comparative performance characteristics for a conventional spin stabilized projectile and a projectile with augmented roll damping. Reference line 12 shows the trajectory of a projectile without augmented roll damping. Reference line 14 shows the trajectory of the projectile of the instant invention with the augmented roll damping feature. The projectile without the range limiting feature (reference line 12) travels up to 12-km, whereas the projectile with the range limiting feature travels less than 8-km, a range reduction of 33%. This difference in maximum travel range can be important when considering the physical limitations of existing training and test ranges. The distance traveled by a projectile is a function of the mass of the projectile. The larger the mass, the greater the distance of its trajectory. However, the inventive roll damping augmentation will proportionally reduce the distance any projectile travels. Thus, the instant roll damping features will apply to any size projectile.

Example 2

Figure 11A:
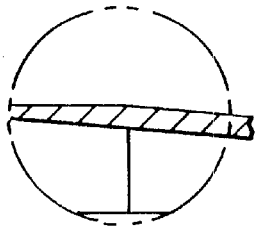
FIG. 11 shows an example of flute dimensions in a biconic configuration.
Figure 11:
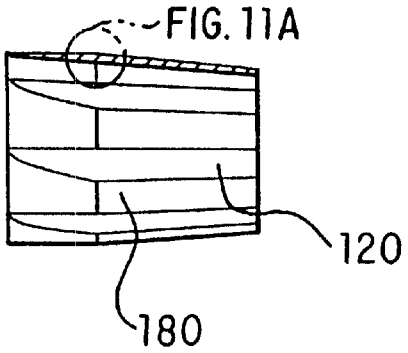
Figure 12A:
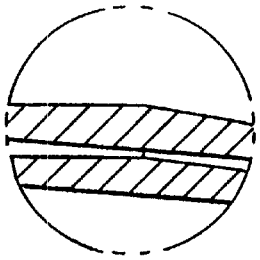
FIG. 12 shows an example of flute dimensions in a cone-cylinder configuration.
Figure 12:
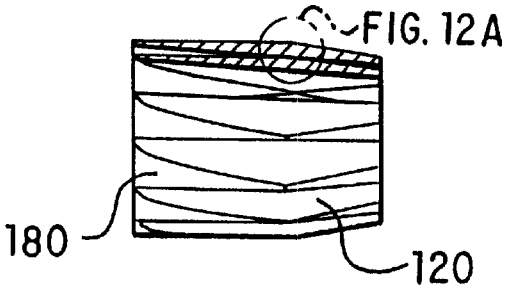

FIGS. 11 and 12 show examples of dimensions of flutes 120. The dimensions are expressed as a percentage of projectile body diameter and thus are applicable to any projectile. FIG. 11 shows a bi-conic projectile with flutes 120 having a depth from the surface of the projectile toward the longitudinal axis of 3.5% of the body diameter. FIG. 12 shows a cone-cylinder projectile where the flute depth is 5.7% of the body diameter for a cone-cylinder configuration. In both the bi-conic and cone-cylinder configurations, the length of the roll damping section is 133% of the body diameter.

The cone-cylinder groove height of 5.7% of the body diameter provided four times the roll damping of a bi-conic groove height of 3.5% of the body diameter.

A preferred embodiment of the invention utilizes recessed flutes 120 having a flat vertical surface extending outward from the longitudinal axis. This configuration increases the effective surface area of the flutes 120. The flutes 120 have a length to height ratio of 15:1. A tungsten cylinder as the midportion 110 allows tailoring of gyroscopic stability to ensure cross-over and range truncation regardless of the ambient air temperature. The crossover rate will be unaffected in muzzle temperatures ranging from +150° C. to −60° C. when a tungsten cylinder is utilized. The flutes 120 or flats 220 may be molded into the tungsten cylinder or may be carved into the tungsten cylinder.

While preferred embodiments of the present invention have been illustrated in detail, it should be apparent that modifications and adaptations to those embodiments may occur to one skilled in the art without departing from the scope of the present invention as set forth in the following claims.

What is claimed is:

1. A spin-stabilizer projectile comprising:

an ogival nose portion;

a posterior portion; and a midportion disposed between said nose portion and said posterior portion, said projectile defining an elongated, aerodynamically-shaped body having an axis of rotation;

said midportion comprising a longitudinally extending roll damping augmentation section disposed in a circumferential surface recess thereof, said roll damping augmentation section comprising a plurality of members which extend outwardly no more than about the depth of said recess and at least twice as high as the projectile boundary layer momentum height, for causing said projectile to become gyroscopically unstable at a predetermined range [and continuously gyroscopically unstable thereafter].

2. The spin-stabilized projectile as described in claim 1 wherein said nose portion is substantially conical in shape throughout the axial dimension thereof.

3. The spin-stabilized projectile as described in claim 1, wherein said roll damping augmentation section members comprises a plurality of elongated juxtaposed flutes in said body and extending longitudinally between said nose portion and said posterior portion wherein the flutes extend outwardly no more than about the depth of said recess in said midportion.

4. The spin-stabilized projectile as described in claim 3 wherein the number of flutes is between 4 and 12.

5. The spin-stabilized projectile of claim 3 further comprising a series of slots of sufficient size for receiving a terminal portion of an associated flute.

6. The spin-stabilized projectile as described in claim 3 wherein the flutes extend radially outward perpendicular to the axis of rotation.

7. The spin-stabilized projectile of claim 1 wherein the roll damping section members are canted relative to the longitudinal axis in the direction of oncoming air.

8. The spin-stabilized projectile as described in claim 7, wherein the roll damping section members are canted at an angle between about 3° and 5° from the longitudinal axis in the direction of oncoming air.

9. The spin-stabilized projectile as described in claim 1, wherein said roll damping augmentation section members comprise a plurality of juxtaposed flats defining grooves formed in the body and extending longitudinally between the nose portion and the posterior portion, said flats extending outwardly approximately no higher than the depth of the recess in the midportion.

10. The spin-stabilized projectile as described in claim 9 wherein the number of flats is between 4 and 12.

11. The spin-stabilized projectile as described in claim 10, wherein the flats are spaced equi-distant around the circumference of the projectile.

12. The spin-stabilized projectile as described in claim 1, wherein the length of the roll damping augmentation section is up to 2.0 times the body diameter of the projectile; and defines a plurality of air cavities each having a depth of between 3% and 7% of the body diameter of the projectile.

13. The spin-stabilized projectile as described in claim 1, wherein said roll damping augmentation section is disposed at the center of gravity of said projectile.

14. The spin-stabilized projectile as described in claim 1, wherein an obturation band is disposed between said roll damping augmentation section and said posterior portion.

* * * * *